May 28, 1929.  J. L. RICHARDSON  1,714,891
AUTOMOBILE BED
Filed June 24, 1926   3 Sheets-Sheet 1

Joseph L. Richardson, Inventor

Witnesses
C. E. Churchman Jr.
J. A. B——

By Richard B. Owen
Attorney

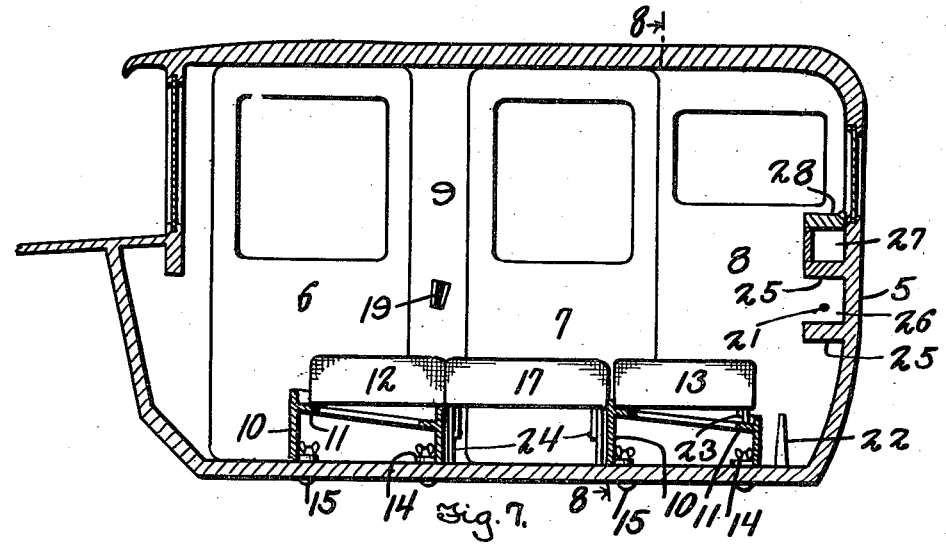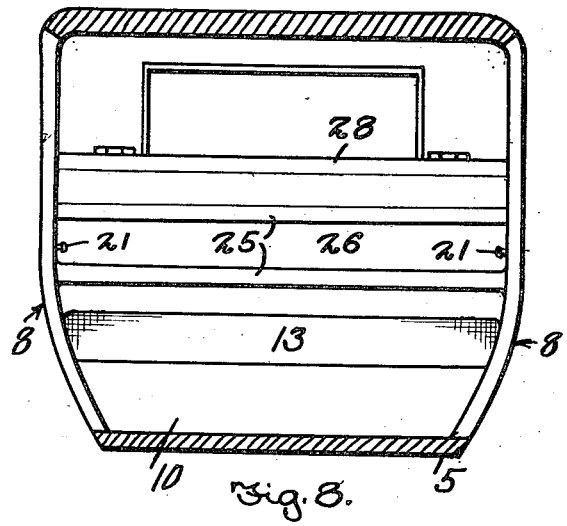

May 28, 1929.  J. L. RICHARDSON  1,714,891
AUTOMOBILE BED
Filed June 24, 1926  3 Sheets-Sheet 3
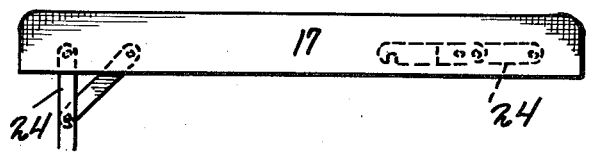
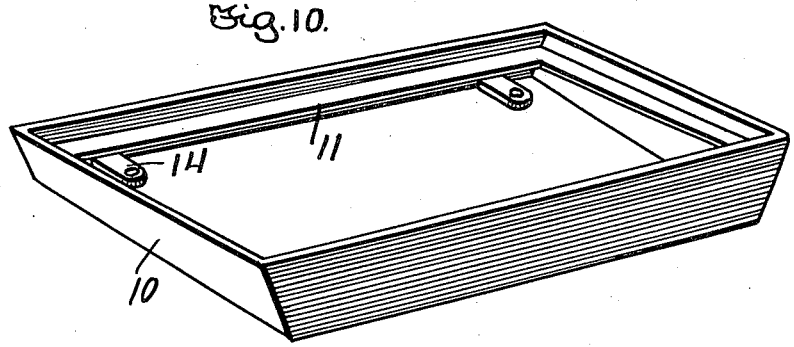
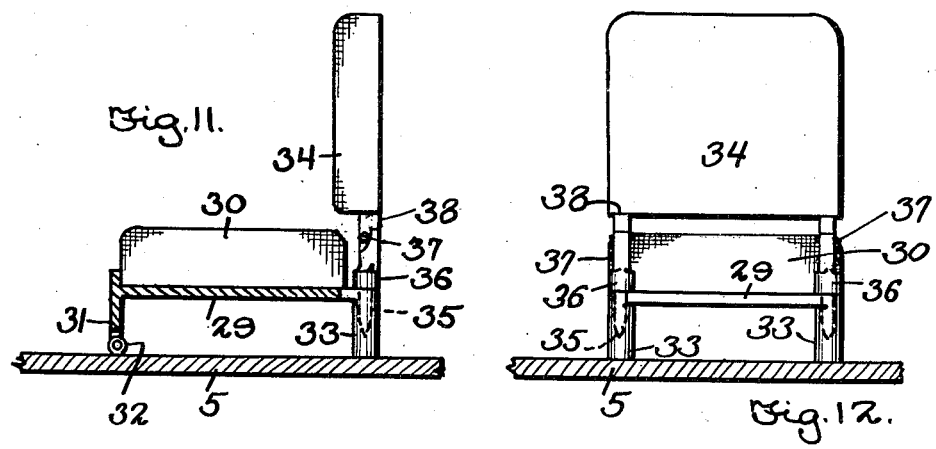
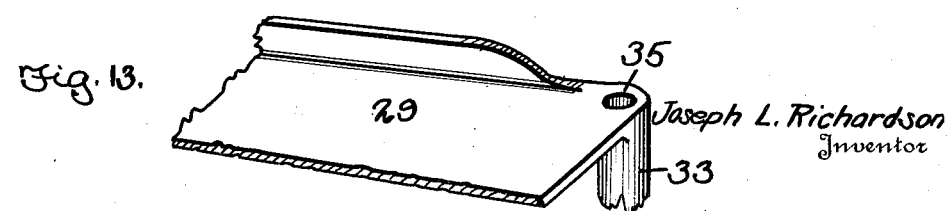
Joseph L. Richardson
Inventor
Witnesses
By Richard B. Owen
Attorney Patented May 28, 1929.

1,714,891

UNITED STATES PATENT OFFICE.

JOSEPH L. RICHARDSON, OF NASHVILLE, ARKANSAS.

AUTOMOBILE BED.

Application filed June 24, 1926. Serial No. 118,288.

This invention relates to improvements in automobile beds, and has more particular reference to a convertible seat construction for motor vehicles whereby the seat cushions and a back rest of the motor vehicle may be positioned to form a horizontal bed bottom.

The primary object of the present invention is to provide an automobile bed construction of the above kind which is extremely simple and durable in construction as well as efficient in operation.

A further object is to provide a convertible seat construction for motor vehicles, wherein the conversion of the seats into a horizontal bed bottom may be effected with extreme facility and ease.

Other objects will become apparent as the nature of the invention is better understood, and the same consists in the novel form, combination and arrangement of parts hereinafter more fully described, shown in the accompanying drawings and claimed.

In the drawings, wherein like reference characters indicate corresponding parts throughout the several views, Figure 1 is a fragmentary longitudinal sectional view of a motor vehicle body of the sedan type having seats constructed in accordance with the present invention, with the seat cushions and back rests of the seats normally positioned to provide the front and rear seats of the vehicle;

Figure 7 is a view similar to Figure 1 with the back rest of the front seat removed and the back rest of the rear seat positioned between the shifted seat cushions of both seats so as to cooperate with the latter for forming the horizontal bed bottom;

Figure 8 is a vertical transverse section taken substantially upon line 8—8 of Figure 7;

Figure 9 is an edge elevational view of the rear seat back rest with one of the foldable legs thereof in extended supporting position and the other legs in folded position;

Figure 10 is an enlarged perspective view of one of the supporting bases for the seat cushions of the seats;

Figure 11 is a fragmentary view partly in section and partly in side elevation showing a form of chair construction, a pair of which is employed in side by side relation for forming the complete front seat of a motor vehicle of the coach type in lieu of the front seat construction of Figures 1 and 7;

Figure 12 is a rear elevational view of the device shown in Figure 11; and

Figure 13 is an enlarged fragmentary perspective view of the base of the chair construction shown in Figures 11 and 12.

Referring more in detail to the drawings, 5 indicates a motor vehicle body of the sedan type having spaced front and rear seats of special construction in accordance with the present invention, and access to which is respectively had through the front and rear doors of the vehicle body, one front door being shown at 6, and one rear door being shown at 7. As is well known in the art, motor vehicles of this type are provided with permanent side wall portions 8 at the sides of the rear seat and rearwardly of the rear doors 7, while permanent pillars or posts 9 are provided at the sides of the front seat between the doors 6 and 7.

Figure 1:
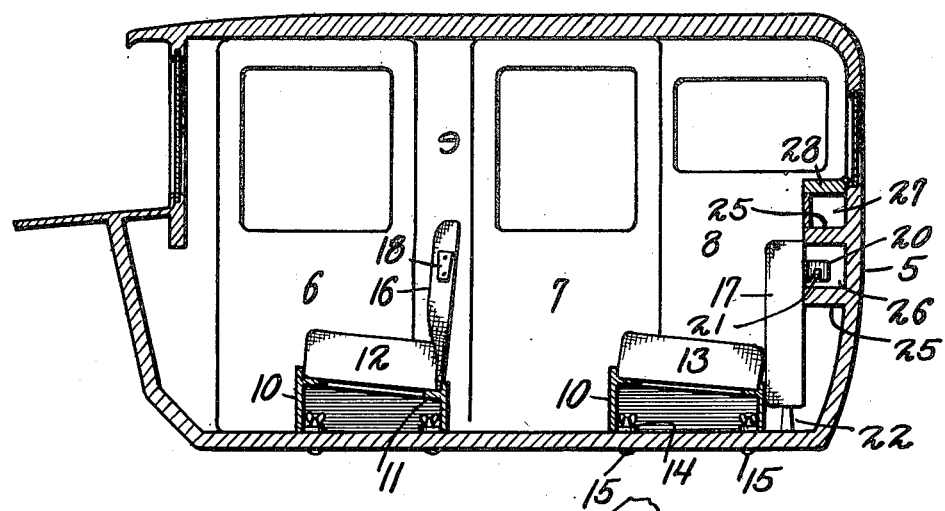
Figure 2:
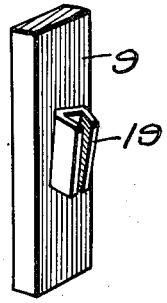
Figure 2 is an enlarged fragmentary perspective view showing a portion of one of the pillars of the vehicle body shown in Figure 1, with the attached keeper or socket forming part of the means for removably retaining the back rest of the front seat in operative position.

As shown, each seat of the vehicle embodies a relatively short or low built hollow supporting base 10 which is rigidly secured upon the floor of the vehicle body and is of such size as to extend from side to side of the latter, a seat cushion being removably supported by ledges or flanges 11, partially within the upper end of each supporting base 10 as shown clearly in Figure 1. The seat cushion of the front seat is indicated at 12, while the seat cushion of the rear seat is indicated at 13, and as shown in the several views, the upper ends of the bases 10 as well as the supporting ledges 11 are arranged at a rearward and downward inclination so that the cushions 12 and 13 are normally supported in a rearwardly inclined position for assuring maximum comfort to the persons occupying the seats. As shown clearly in Figures 1, 7 and 10, the supporting bases 10 are preferably provided with interior bottom ears or apertured lugs 14 adapted to flatly lie upon the floor of the body of the vehicle and to be rigidly removably bolted to the floor as indicated at 15. It is generally noted that the front seat embodies a removable upholstered back rest 16, while the rear seat embodies a removable upholstered back rest 17. It is thus apparent that the entire rear seat construction may be removed if desired so as to present considerable un-obstructed space for transportation of articles, goods or the like similar to the use of truck bodies.

Figure 3:
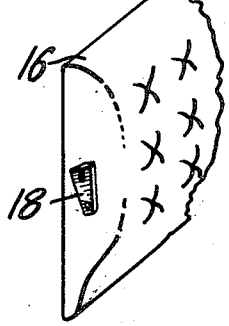
Figure 3 is a fragmentary perspective view showing an end portion of the back rest of the front seat, together with the attached wedge plate adapted to cooperate with the keeper or socket shown in Figure 2 for forming one of the pair of devices utilized for removably retaining the back rest of the front seat in operative position.
Figures 4, 5, 6:
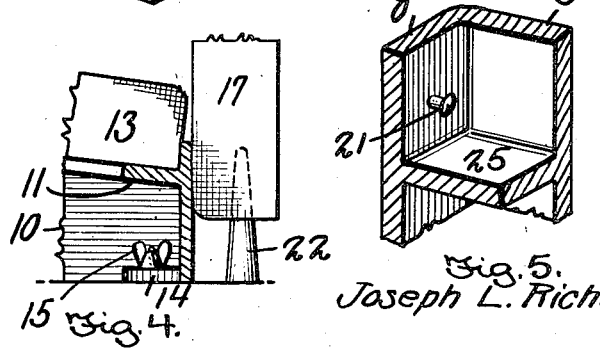
Figure 4 is an enlarged fragmentary view, partly in side elevation and partly in longitudinal section, showing adjacent portions of the seat cushion, supporting base and back rest of the rear seat of Figure 1.
Figure 5 is a fragmentary perspective view showing a corner portion of the vehicle body of Figure 1 and the adjacent keeper pin forming part of the means for removably securing the back rest of the rear seat in operative position.
Figure 6 is a view similar to Figure 3 of the back rest of the rear seat, illustrating the attached end hook engageable with the keeper pin of Figure 5 to form one of the pair of devices for retaining the back rest of the rear seat in operative position.

Secured to the ends of the front seat back rest 16 are wedge plates 18 which are substantially vertically arranged with their narrower ends lowermost as clearly shown in Figure 3, and attached to the inner sides of the pillars 9 are keeper elements or sockets 19 having downwardly converging side jaws and adapted for snug retaining engagement of the wedge plates 18 for removably securing the back rest 16 in operative position as shown in Figure 1. In order to relieve the plates 18 and keepers 19 of considerable strain, the back rest 16 is adapted to extend behind the seat cushion 12 and rest against the forward surface of the rear wall of the front supporting base 10, at its lower end, as shown in Figure 1. In view of the above construction, it will be seen that the front seat back rest 18 may be removed by simply lifting the same upwardly until the wedge plates 18 are disengaged from the keepers 19, while a mere reversal of this operation will result in operatively positioning the back rest 16.

Rigid with each end of the rear seat back rest 17 is a horizontal rearwardly projecting hook 20, and fixed to each side of the vehicle body or to each permanent body portion 8 rearwardly of the upper end of the back rest 17 is a headed pin 21 arranged to be releasably engaged by the hook 20 at the adjacent end of the back rest 17. It is thus apparent that when the hooks 20 are engaged with the pins 21, the back rest 17 will be effectively held against forward shifting from operative position. Rigid with the floor of the vehicle body adjacent each side of the latter and directly behind the rear supporting base 10 is a vertical pointed or tapered pin 22. The back rest 17 is provided in its lower edge with a pair of sockets into which these pins 22 are adapted to project when said back rest is operatively positioned with its lower portion disposed rearwardly of the cushion 13 and its supporting base 10 and then lowered to effect engagement of the hooks 20 with the pins 21. In this manner the back rest 17 is rigidly supported against accidental displacement from operative position, although its manual removal is readily permitted. Naturally, such removal will simply require first a lifting of the back rest 17 until the hooks 20 are disengaged from the pins 21 and the pins 22 are disengaged from the sockets of the back rest, whereupon a forward movement is imparted to the back rest 17 for its final removal.

The seat cushion 13 of the rear seat is provided with displaceable or foldable legs as indicated at 23 in Figure 7 adapted to be lowered or extended so that the seat cushion 13 will be supported in a horizontal position when cooperating with the back rest 17 and the seat cushion 12 to form a horizontal bed bottom instead of remaining in its rearwardly inclined normal position as in Figure 1. Such horizontal supporting of the front seat cushion 12 may be effected by simply lifting the rear end of said cushion 12 and then shifting the latter rearwardly so that it rests at its rear edge or end upon the upper edge of the rear wall of the supporting base 10 as shown in Figure 7. The back rest 17 of the rear seat is of such size as to completely fill the space between the cushions 12 and 13 when they are horizontally positioned as just described, and as shown in Figure 7, and in order to support the back rest 17 at the required elevation at this time so that the cushions 12 and 13 and back rest 17 will all be disposed in the same horizontal plane, I provide the back rest 17 with a pair of supporting legs 24 along each of the upper and lower edges thereof. These supporting legs 24 of the back rest 17 are displaceable (either detachable or foldable), and when extended will rest upon the floor of the vehicle body so as to support the back rest 17 at the required elevation between the cushions 12 and 13. As shown, the legs 24 are of the foldable type so as to not interfere with the operative positioning of the back rest as in Figure 1, and such legs are so arranged as to project rearwardly from the rear side of the back rest 17 when extended so that the front side of the back rest is uppermost when supported by the legs 24 in a horizontal position between the seat cushions 12 and 13 as shown in Figure 7. It will be noted that the front seat back rest 16 is removed to allow the shifting of the seat cushion 12 from the position of Figure 1 to the position of Figure 7, and such back rest 16 is placed out of the way so that merely the seat cushions 12 and 13 and the rear seat back rest 17 are utilized to form the bed bottom. It is also noted that the front seat may be left in its normal condition as shown in Figure 1 and the back rest 17 disposed with respect to the seat cushion 13 as shown in Figure 7. This will provide a short bed bottom for children, and will at the same time permit a driver to occupy the front seat for continuing a trip or journey.

Referring to Figures 1 and 7 it will be seen that the body 5 may be constructed with forwardly projecting horizontal shelves 25 which are rigid with the rear wall of the vehicle body and arranged to form a compartment 26 adapted for containing bed clothing when the bed bottom is not employed, such compartment 26 being closed by the upper end of the back rest 17 at such time. Further, a second compartment 27 may be constructed above the compartment 26 and provided with a hinged lid 28 for accommodating other articles. Substantially the same construction as described above may be had when adapting the invention to vehicle bodies of the open or touring type.

It is well known that vehicle bodies of the coach type are not provided with rear doors and that passage to and from the rear seat through the front door is allowed by the provision of a pair of folding chair-like structures which are disposed in side by side relation to cooperate for forming the complete front seat of the vehicle. To accommodate the present invention to vehicle bodies of the coach type, the construction will only be varied with respect to the construction of the front seat shown in Figures 1 and 7. Such change is generally the mere provision of a pair of chair like structures of the form shown in Figures 11 to 13 inclusive in lieu of the front seat construction of Figures 1 and 7. In providing this modified form of front seat construction, a pair of similar chair-like structures are provided in side by side relation, and as such chair-like constructions are alike and of the form shown in Figures 11 to 13 inclusive, the description of one will suffice for both. As shown, each chair or chair construction includes a supporting base 29 having a seat cushion or upholstered as indicated at 30 and provided with front supporting legs 31 hinged to the floor of the body 5 so that the chair may be swung from its normal horizontal position forwardly and upwardly to a vertical forwardly shifted position, the base 29 being provided with rear supporting legs 32 merely contacting with and resting upon the floor. As is usual in this type of construction, each chair or chair structure has a hinged back rest member 34 adapted to be folded forwardly onto the cushion or upholstery 30 so that the chair may be swung forwardly about the hinges 32 in a convenient manner. In accordance with the present invention the back rest members 34 of the chairs are removable from their bases 29 so that the complete back rest of the front seat may be removed for permitting the cushion 30 to cooperate with the cushion 13 and back rest 17 for forming a horizontal bed bottom as illustrated in Figure 7. For this purpose, the rear supporting legs 33 are provided with sockets 35, and attached to the lower edge of the back rest member 34 of each chair adjacent each side of such back rest member 34 is a pin 36. These pins 36 are disposed to be removably inserted into the sockets 35 of the legs 33 so that the back rest member 34 is removably attached to the base 29, and the upper ends of the pins 37 are hinged as at 37 to depending brackets 38 on the lower edge of the back rest member 34 whereby the latter may be swung forwardly and downwardly onto the cushion 30 as mentioned above. With this construction it is apparent that the back rest 17 may be disposed as shown in Figure 7 and the back rest member 34 of only one chair construction removed. This will provide sleeping accommodation for one adult and one child and at the same time furnish a complete chair or seat section for accommodating a driver so that the occupants of the vehicle may alternately rest and drive the vehicle for avoiding interruption of the trip or journey. When the back rest member 34 of both chair constructions are removed accommodation of two adults upon the horizontal bed bottom will be had. Obviously, the removal of the back rest members 34 of the front seat composed of chair constructions as shown in Figure 11, is permitted by mere upward displacement of said back rest members for effecting disengagement of the pins 36 from the sockets 35.

From the foregoing description it is believed that the construction and operation as well as the advantages of the present invention will be readily understood and appreciated by those skilled in the art Minor changes may be made without departing from the spirit and scope of the invention as claimed.

What I claim as new is:—

In a motor vehicle body having front and rear seats provided with seat cushions and removable back rests wherein the back rest of the rear seat is of a size to completely span the space between the seat cushions for the setting up of a horizontal bed structure, means for removably securing the back rest of the rear seat in place, comprising a keeper element fixed to the vehicle body rearwardly of the operative position of said back rest, a rearwardly projected hook on said back rest engageable with said keeper element, and rigid pins projecting upwardly from the floor of the vehicle body at the rear of the rear seat cushion, said back rest of the rear seat having sockets in its lower edge adapted to receive the pins when said back rest is lowered into operative position.

In testimony whereof I affix my signature.

JOSEPH L. RICHARDSON.